(12) United States Patent
Youn

(10) Patent No.: US 6,326,756 B1
(45) Date of Patent: Dec. 4, 2001

(54) METHOD AND APPARATUS FOR APPLYING A DRIVING VOLTAGE TO A MOTOR OF AN OPTICAL DISK DEVICE

(75) Inventor: Jeong-Chae Youn, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/606,002

(22) Filed: Jun. 29, 2000

(30) Foreign Application Priority Data

Jul. 2, 1999 (KR) .................................................. 99-26649

(51) Int. Cl.[7] .................................................. G05B 19/18
(52) U.S. Cl. ......................................... 318/569; 318/459
(58) Field of Search .................................... 318/565, 567, 318/569, 601, 459, 500; 360/77.3

(56) References Cited

U.S. PATENT DOCUMENTS

| 4,825,137 | * | 4/1989 | Nakajima et al. | 318/594 |
| 4,942,563 | * | 7/1990 | Yamamuro | 369/44.11 |
| 5,570,330 | * | 10/1996 | Okawa | 369/44.32 |
| 5,706,264 | | 1/1998 | Ando | 369/50 |
| 5,757,747 | * | 5/1998 | Shimada | 369/44.28 |
| 6,054,825 | * | 4/2000 | Hayner | 318/459 |
| 6,153,997 | * | 11/2000 | Kobayashi et al. | 318/560 |

FOREIGN PATENT DOCUMENTS

10326450 * 12/1998 (JP).

OTHER PUBLICATIONS

JP-A-09-035273, Feb. 7, 1997, abstract only.
JP-A-05-282809, Oct. 29, 1993, abstract only.

* cited by examiner

Primary Examiner—Robert E. Nappi
Assistant Examiner—Rina I. Duda

(57) ABSTRACT

The present invention relates to method and apparatus for finding the digital value requiring to drive a motor of an optical disk device and applying a driving voltage according to the digital value to the motor. The method according to the present invention digitize an analog constant reference voltage using a supplied operating voltage varying within a predetermined range, determines the current value of the supplied operating voltage based upon the digitized value, calculates a digital control voltage for a given driving voltage so that the calculated voltage may have different value according to the determined current value, and applies a driving voltage corresponding to the calculated digital control voltage to a motor for moving an optical pickup. The method and apparatus according to the present invention outputs a driving voltage to a motor without being effected by the variance of a supplied operating voltage, thereby achieving more accurate movement of an optical pickup driven by the motor at all times, and reducing an access time when an optical disk is moved to other position.

10 Claims, 4 Drawing Sheets

Conventional Art

| | x | .... | 25 | 26 | .... | 50 |
|---|---|---|---|---|---|---|
| | $A_A$ \ $C_D$ | .... | 5V | 4.94V | .... | 4.5V |
| | | | 68 $01000100_{(2)}$ | 69 $01000101_{(2)}$ | .... | 76 $01001100_{(2)}$ |
| 1 | 0.3V | .... | 15 $00001111_{(2)}$ | 15 $00001111_{(2)}$ | .... | 17 $00010001_{(2)}$ |
| ⋮ | ⋮ | | ⋮ | ⋮ | | ⋮ |
| M-th | 1.5V | .... | 76 $01001100_{(2)}$ | 77 $01001101_{(2)}$ | .... | 85 $01010101_{(2)}$ |
| ⋮ | ⋮ | | ⋮ | ⋮ | | ⋮ |
| N-th | 2.1V | .... | 107 $01101011_{(2)}$ | 108 $01101100_{(2)}$ | .... | 119 $01110111_{(2)}$ |
| ⋮ | ⋮ | | ⋮ | ⋮ | | ⋮ |
| | 2.7V | .... | 137 $10001001_{(2)}$ | 139 $10001011_{(2)}$ | .... | 153 $10011001_{(2)}$ |

$A_D$

*Table prestored in the ROM*

METHOD AND APPARATUS FOR APPLYING A DRIVING VOLTAGE TO A MOTOR OF AN OPTICAL DISK DEVICE

BACKGROUND OF THE INVENTION

1. Field of the Invention

The present invention relates to method and apparatus for finding the digital value requiring to drive a motor of an optical disk device and applying a driving voltage according to the digital value to the motor.

2. Description of the Related Art

FIG. 1 depicts a block diagram of an optical disk device equipped in a personal computer (PC), which comprises an optical pickup 11 for reading recorded digital signals through detecting a laser beam reflected across pits formed in the surface of an optical disk 10 and converting them into electric signals; a spindle motor 12a for rotating the inserted optical disk 10; a sled motor 12b for moving the optical pickup 11 radially on the disk 10; an R/F unit 20 for equalizing and shaping analog RF signals detected by the optical pickup 11 into binary signals; a servo unit 30 for controlling the optical pickup 11 and the rotation of the optical disk 10 based upon a focussing error signal and a tracking error signal yielded from the R/F unit 20; a motor driver 31 for driving the spindle motor 12a and the sled motor 12b separately; a voltage regulator 40 regulating the operating voltage supplied from an external source such as a PC slot to provide a constant voltage for signal processing; a digital signal processor (DSP) 50 for processing the binary signals shaped from the R/F unit 20 to restore them into original digital data; a microcomputer 60 for outputting a digital control voltage for driving the motors 12a and 12b and controlling the above elements while reproducing the optical disk 11; and a D/A converter 70 for converting the digital control voltage from the microcomputer 60 into an analog voltage.

The above conventional optical disk device equipped in a PC performs reproduction process with the power supplied from the PC slot. When an optical disk 10 is inserted in a tray (not figured) equipped in the optical disk device and clamped by a clamper (not figured), the microcomputer 60 outputs control voltages to drive the spindle motor 12a and the sled motor 12b respectively through the motor driver 31, thereby the spindle motor 12a rotates the optical disk 10 at a constant speed of 2,500 rpm owing to the driving voltage supplied from the motor driver 31. At the same time, the sled motor 12b, which is a stepping motor, moves the optical pickup 11 to an initial reproduction position of the optical disk 10. This operations done, the reproduction process starts.

During the reproduction, the optical pickup 11 should be moved radially on a request for search or movement. In this case, the microcomputer 60 controls the sled motor 12b. The detailed control process of the microcomputer 60 is as follows.

If the microcomputer 60 intends to apply a certain driving voltage, for example 1.5V, to the sled motor 12b, the microcomputer 60 applies the value of $01001100_{(2)}$ which is a digital value of 76(=1.5÷5×255) to the D/A converter 70 because the microcomputer 60 divides the external operating voltage of 5V into 255 steps (in case of 8 bit D/A converter), and the D/A converter 70 converts the digital value of $01001100_{(2)}$ into an analog voltage of 1.5 (=76÷255×5). Accordingly, the motor driver 31 generates micro step pulses corresponding to 1.5V, thereby the sled motor 12b is rotated so that the pickup 11 moves to target location.

However, the operating voltage supplied from an external source may be changed from 5.5V to 4.5V since the external power supplied from a PC slot has variance range of ±10%, and the microcomputer 60 cannot be aware of the changes of the supplied power. Accordingly, the microcomputer 60 still outputs the digital value for 76 to the D/A converter 70 if it is intends to apply 1.5V to the sled motor 12b even in the condition that the operating voltage has been changed as much as maximum 10%.

However, the analog voltage converted for the digital value of 76 by the D/A converter 70, which converts the input digital value into an analog voltage in the basis of the supplied operating voltage, becomes not 1.5V but 1.3V (=76÷255×4.5) if the supplied operating voltage has been reduced to 4.5V. Accordingly, the sled motor 12b can not move the pickup 11 as much as desirable, which causes time delay in finding a target track since an additional movement is required.

SUMMARY OF THE INVENTION

It is an object of the present invention to provide method and apparatus for computing a driving voltage for a desirable movement without being effected by an operating voltage even though the operating voltage supplied from an external source is changed, and applying the computed voltage to a motor, thereby achieves more accurate movement of an optical pickup at all times.

The apparatus according to the present invention comprises a converting means, which an operating voltage varying within a predetermined range is supplied to, for converting an applied constant reference voltage into digital data; a controlling means for calculating a digital control voltage for a given driving voltage to be applied to a motor so that the calculated voltage may have different value according to the digital data converted by said converting means; and a driving means, which the operating voltage is supplied to, for converting the calculated digital control voltage into an analog driving voltage to apply to the motor for moving an optical pickup.

The method according to the present invention comprises the steps of digitizing an analog constant reference voltage using a supplied operating voltage varying within a predetermined range; determining the present value of the supplied operating voltage based upon the digitized value; calculating a digital control voltage for a given driving voltage so that the calculated voltage may have different value according to the determined present value; and applying a driving voltage corresponding to the calculated digital control voltage to a motor for moving an optical pickup.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings.

DETAILED DESCRIPTION OF THE PREFERRED EMBODIMENTS

In order that the invention may be fully understood, preferred embodiments thereof will now be described with reference to the accompanying drawings.

Figure 1:
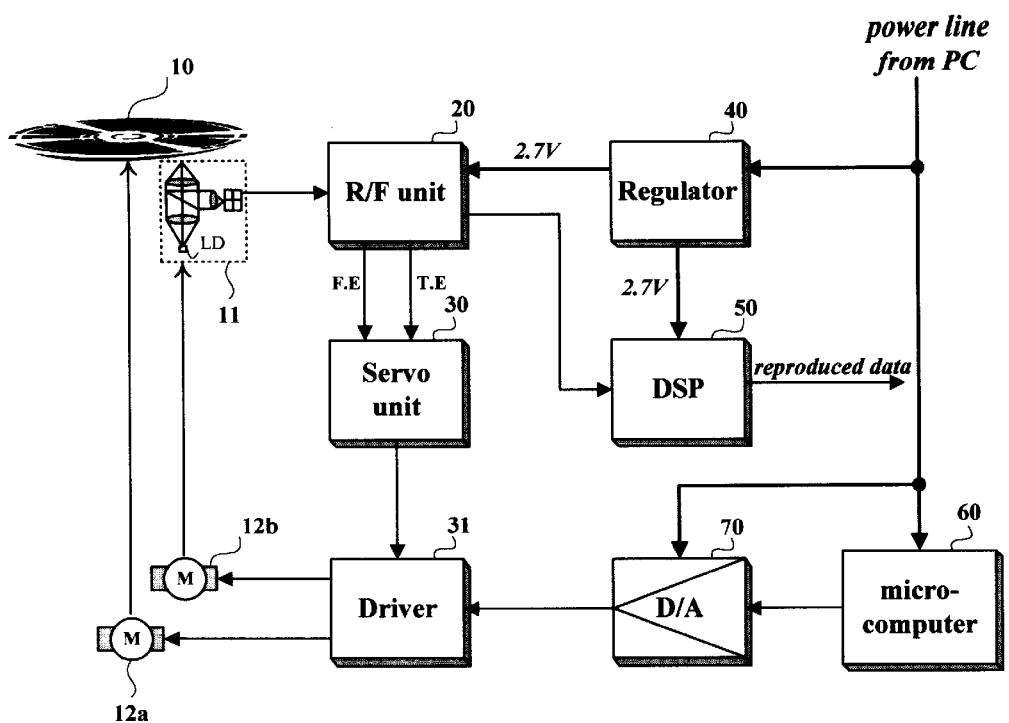
FIG. 1 is a simplified block diagram of a conventional optical disk device.
Figure 2:
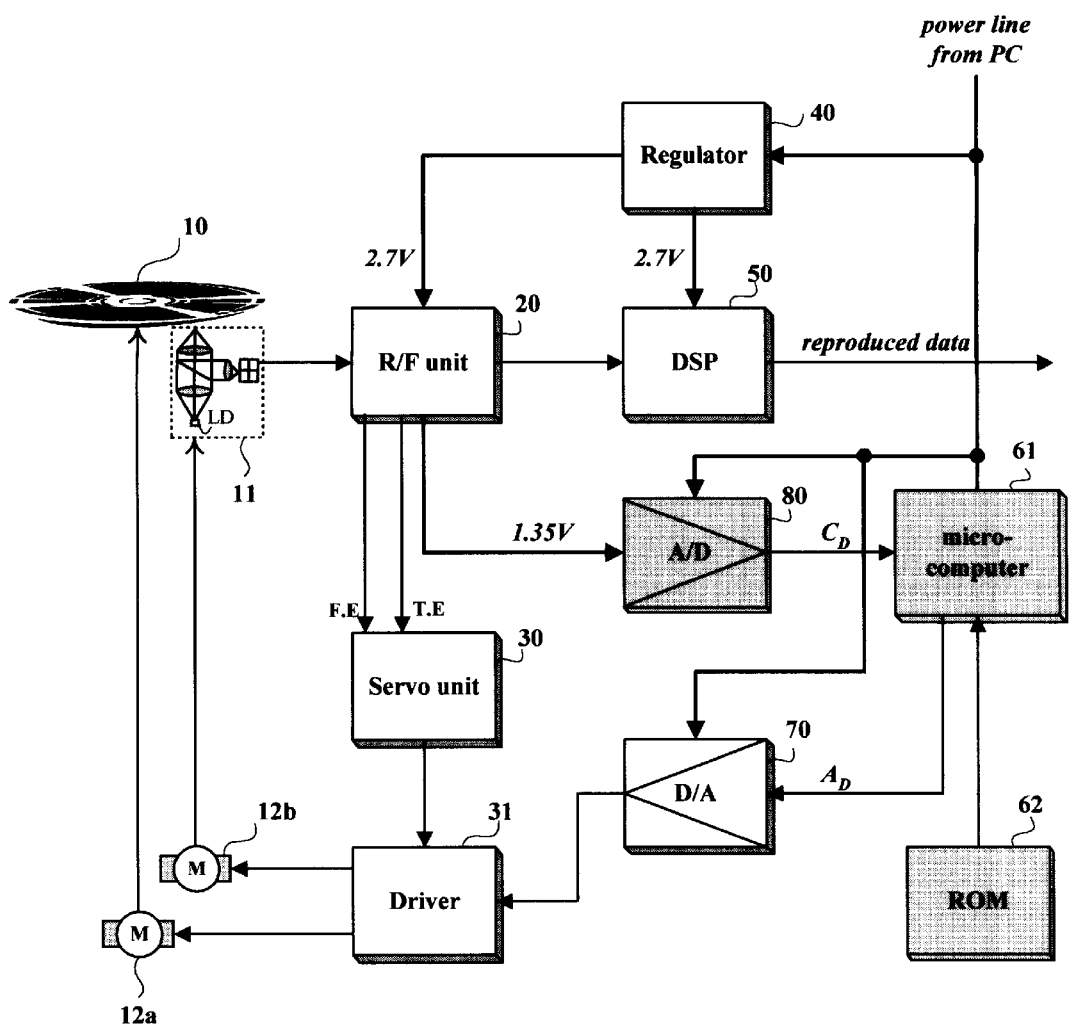
FIG. 2 is a simplified block diagram of an optical disk device equipping with a preferred embodiment of a motor driving-voltage applying device according to the present invention.

FIG. 2 is a block diagram of an optical disk device equipping with a preferred embodiment of applying a driving voltage to a motor according to the present invention, which comprises same elements of FIG. 1, whose functions are described therein; a ROM 62 storing digital control data according to an operating voltage varying within a predetermined range and each given driving voltage to be applied to the sled motor 12b; and an A/D converter 80 for converting a constant reference voltage, whose magnitude is 1.35V, to be used as a slice level in the R/F unit 20 into digital data. The operating voltage is also supplied to the A/D converter 80.

Figure 3:
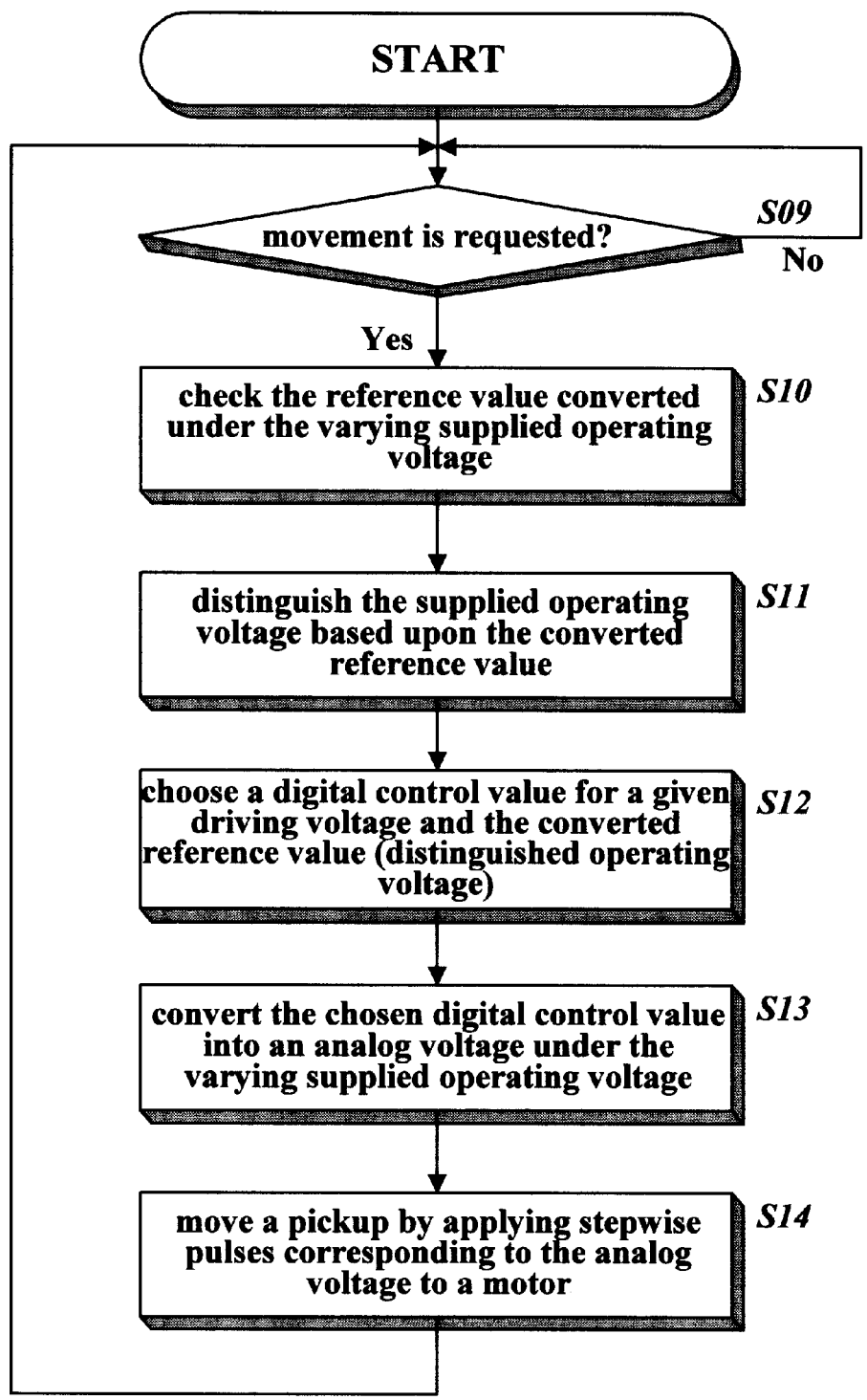
FIG. 3 is a flow diagram of a preferred embodiment of a motor driving-voltage applying method according to the present invention.

FIG. 3 is a flow diagram of a preferred embodiment of a method for applying a driving voltage to a motor according to the present invention. The procedures of FIG. 3 carried out by the disk device organized as FIG. 2 will be explained in detail.

Figures 4, 5:
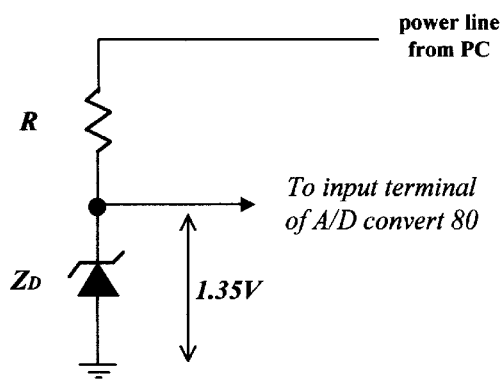
FIG. 4 shows an example of digital control voltages for the supplied operating voltage and given motor driving voltages.
FIG. 5 is another circuit for gaining a constant reference voltage.

The ROM 62 stores a lot of digital data for control voltages to be applied to the motor driver 31 as shown in FIG. 4. Each digital data is chosen according to a given driving voltage to be applied to the sled motor 12b and the current magnitude of the operating voltage supplied from an external source. The data table in the ROM 62 is obtained and one of them is selected as follows.

An operating voltage varying within a predetermined range which is supplied from an external source such as a PC slot is broken down by a specific interval, for example 0.02V as in FIG. 4, and the converted values ($C_D$) for the constant reference value 1.35V are calculated on the assumption that each of the divided operating voltages is supplied. The equation of "$C_D$=1.35 (the constant reference voltage) 255 ($FF_{(16)}$)÷x (one of the divided operating voltages)" is used to obtain the converted values.

According to the equation, the constant reference voltage of 1.35V results in a digital value of 68 ($01000100_{(2)}$) under the condition that the supplying voltage is 5V, and a digital value of 76 ($01001100_{(2)}$) under the condition of the supplying voltage of 4.5V as shown in FIG. 4. Other digital values for the constant reference voltage are also obtained for other supplying voltage values of 5.5, 5.48, 5.46, . . . , and 4.52.

After obtaining 1.35V-converted digital values for each divided analog operating voltage, digital control values ($A_D$) corresponding to a given driving voltage to apply to the motor 12b under the condition of each divided operating voltage are computed based upon the equation of "$A_D$=a given analog driving voltage ($A_A$)÷one of the divided operating voltages (x)×255 ($FF_{(16)}$)".

For example, if a given driving voltage to apply to the motor is 2.1V and the supplying operation voltage is 5V, a digital value ($A_D$) of 107 ($01101011_{(2)}$) is derived according to the above equation, that is 2.1V÷5V×255 results in 107.

Substituting all possible values for the driving voltage and the operating voltage into the above equation, all digital control voltages ($A_D$) are obtained and then stored in the ROM 62 as shown in FIG. 4.

In the condition that the ROM 62 containing the information of FIG. 4 is installed, the voltage regulator 40 regulates the operating voltage supplied from an external source to provide a constant voltage of 2.7V to the R/F unit 20 and the digital signal processor 50. The R/F unit 20 gets 1.35V reference voltage from the constant voltage applied from the voltage regulator 40 by dividing the applied 2.7V, and also outputs the reference voltage for the A/D converter 80 to use. The R/F unit 20 slices a reproduced RF signal above and below the reference voltage.

The A/D converter 80, which is operating with the supplied operating voltage, converts the constant reference voltages of 1.35V applied from the R/F unit 20, then the converted value is "1.35 (constant reference voltage) 255 ($FF_{(16)}$)÷(present operating power source)".

Therefore, the microcomputer 61 checks the converted value provided by the A/D converter 80 at first (S10) when a movement between tracks is requested (S09). Supposed that the present magnitude of the operating voltage is 5V, the digital value converted by the A/D converter 80 is 68 ($01000100_{(2)}$) (=1.35V×255($FF_{(16)}$)÷5V).

The microcomputer 61 accomplishes the following search operation to know the current magnitude of the operating voltage supplied from an external source (S11) according to the converted digital value.

The microcomputer 61 searches the row consisting of the divided operating voltages ($C_D$) in the ROM 62 for an exact or closest to the converted digital value of 68 ($01000100_{(2)}$) which means that the current operating voltage is 5V. Then, the exact or closest value is discovered, the microcomputer 61 knows the present supplying voltage, searches the 25th column, in which the converted value 68 is located, for a digital control voltage according to a given driving voltage to apply to the motor 12b. For example, if the given driving voltage is 2.1V, the microcomputer 61 extracts the value of 107 ($01101011_{(2)}$) located in the N-th row of the that column (S12).

Then, the microcomputer 61 outputs the extracted digital control voltage to the D/A converter 70, and the D/A converter 70 converts the received digital control voltage into analog voltage of 2.1V (S13) since the current operating voltage supplied to the D/A converter 70 is 5V. The motor driver 31 receiving the converted analog voltage drives the sled motor 12b (S14) by applying stepwise driving pulses corresponding to the converted voltage of 2.1V, thereby moving the optical pickup 11 exactly as much as desirable.

Meanwhile, the R/F unit 20 equalizes and shapes the high frequency signals detected from the tracks into binary signals by using the constant reference voltage of 1.35V after the movement of the optical pick 11 has been completed. The binary signals are then applied to the digital signal processor 50 which processes the received binary signals to restore them into the original digital data. According to these operations, the data recorded in the optical disk 10 are reproduced.

If a new movement of the optical pickup 11 is requested during the reproduction process, the microcomputer 61 reads again the converted digital value from the A/D converter 80 to check whether the supplied operating voltage is changed. If the supplied operating voltage is decreased from 5V to 4.5V, the microcomputer 61 receives the value of 76 converted by A/D converter 80 and then changes the column of digital control voltages from 25th to 50th in the table of the ROM 62. Therefore, if a given driving voltage to be applied to the motor 12b is 2.1V too, the digital control voltage for the given driving voltage is searched in the 50th column, and the value $A_D$ of 119 ($01110111_{(2)}$) of the N-th row corresponding to 2.1V is selected instead of 107 ($01101011_{(2)}$).

Thus, the microcomputer 61 applies the selected value of 119 to the D/A converter 70, even though the given driving voltage is same with the afore-mentioned example. The D/A converter 70 to which the 4.5V operating voltage is being supplied at present converts the digital value of 119 to the given driving voltage of 2.1V (=4.5×119÷255) under the condition that the supplied voltage has been reduced. Accordingly, the driving voltage to be applied to the motor driver 31 is never changed no matter how the operating voltage supplied from an external source is changed. In other words, the driving power to apply to the motor is always same if the distance for the pickup to move is same.

In above embodiment, the sled motor 12b is driven by a digital control voltage selected among pre-stored values in the ROM 62. Differently from the above embodiment, the microcomputer 61 may calculate and derive a desired value of a digital control voltage by itself by using the afore-mentioned equations.

Firstly, the microcomputer 61 calculates the operating voltage according to the equation of "a operating voltage (x)=255÷A/D converted value×1.35", and then substitutes the calculated operating voltage into the equation of "a digital control voltage ($A_D$)=the given driving voltage to apply to a motor÷the obtained operating voltage (x)×255" to derive a desired digital control value for a given driving voltage.

Substituting the equation for the operating voltage (x) into the equation for the digital control voltage ($A_D$) results in "a digital control voltage (x)=a driving voltage to apply to a motor×'A/D converted value'÷1.35 (reference voltage)". Therefore, the microcomputer 61 may use this equation to derive a digital control value for a given driving voltage instead of two-step calculation according to the two above equations.

After deriving the value of the digital control voltage, the microcomputer 61 applies the derived value to the D/A converter 70 which converts the applied input into an analog voltage. The motor driver 31 drives the sled motor 12b by generating stepwise driving pulses corresponding to the converted analog voltage, thereby moving the optical pickup 11 as much as desirable.

FIG. 5 is a circuit of another embodiment for gaining a constant reference voltage. The circuit depicted in FIG. 5 gains the constant reference voltage directly from the operating voltage supplied from an external source instead of using the level slicing voltage which is used for slicing R/F signals into binary waveform. The rating of the Zener diode $Z_D$ adopted in FIG. 5 is 1.35V, which is equal to the slicing level used in the R/F unit 20. Accordingly, even though the external power source is changed within a predetermined range, all the changed components are absorbed across the resistor R, so that the constant voltage of 1.35V is always applied across the Zener diode $Z_D$.

In this embodiment, the A/D converter 80 converts the constant voltage applied across the Zener diode $Z_D$ into digital data, and applies the digital value to the microcomputer 61. The microcomputer 61 calculates a digital control voltage ($A_D$) for a desired driving voltage by substituting the digital data converted from 1.35V into the above equation or searching the value in the table pre-stored in the ROM 62.

The above-explained method and apparatus according to the present invention outputs a driving voltage to a motor without being effected by the variance of a supplied operating voltage, thereby achieving more accurate movement of an optical pickup driven by the motor at all times, and reducing an access time when an optical disk is moved to other position.

The invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An apparatus for applying a driving voltage to a motor for moving an optical pickup, comprising:

a first converting means, which an operating voltage varying within a predetermined range is supplied to, for converting an applied constant reference voltage into digital data;

a second converting means, which the operating voltage is supplied to, for converting an applied digital control voltage into an analog voltage;

a driving means for outputting a driving voltage corresponding to the converted analog voltage to the motor; and a controlling means for determining the digital control voltage for an arbitrary driving voltage differently according to the digital data converted by said first converting means, and applying the determined digital control voltage to said second converting means.

2. An apparatus set forth in claim 1, wherein said constant reference voltage is used for a slicing level to shape a reproduced signal into a binary waveform.

3. An apparatus set forth in claim 1, wherein said controlling means selects the digital control voltage from a prestored table in the basis of the digital data driving voltage.

4. An apparatus set forth in claim 1, wherein said controlling means derives the digital control voltage to be applied to the second converting means from the equation of "a driving voltage to apply÷the constant reference voltage×a value converted by the first converting means".

5. An apparatus for applying a driving voltage to a motor for moving an optical pickup, comprising:

a converting means, which an operating voltage varying within a predetermined range is supplied to, for converting an applied constant reference voltage into digital data;

a controlling means for calculating a digital control voltage for a given driving voltage to be applied to the motor so that the calculated voltage may have different value according to the digital data converted by said converting means; and a driving means, which the operating voltage is supplied to, for converting the calculated digital control voltage into an analog driving voltage to apply to the motor.

6. An apparatus set forth in claim 5, wherein said constant reference voltage is used for a slicing level to shape a reproduced signal into a binary waveform.

7. An apparatus set forth in claim 5, wherein said controlling means derives the digital control voltage for a driving voltage which is changed according to a ratio of the digital data converted by said converting means to the constant reference voltage.

8. A method for applying a driving voltage to a motor for moving an optical pickup, comprising the steps of:
  (a) digitizing an analog constant reference voltage using a supplied operating voltage varying within a predetermined range;
  (b) determining the current value of the supplied operating voltage based upon the digitized value;
  (c) calculating a digital control voltage for a given driving voltage so that the calculated voltage may have different value according to the determined current value; and
  (d) applying a driving voltage corresponding to the calculated digital control voltage to the motor.

9. A method set forth in claim 8, wherein said constant reference voltage is used for a slicing level to shape a reproduced signal into a binary waveform.

10. A method set forth in claim 8, wherein said step (c) changes the given driving voltage according to a ratio of the digitized value to the constant reference voltage, and obtains the digital value for the changed driving voltage.

* * * * *